March 10, 1959 C. SAURER 2,876,635
UNIVERSAL COUPLING
Filed March 5, 1956 2 Sheets-Sheet 1
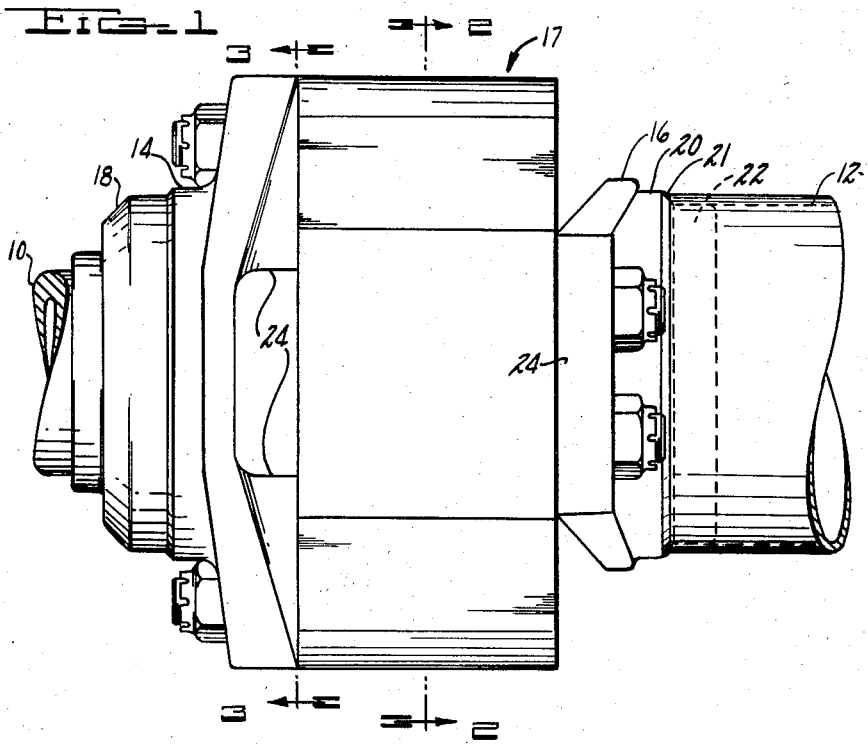
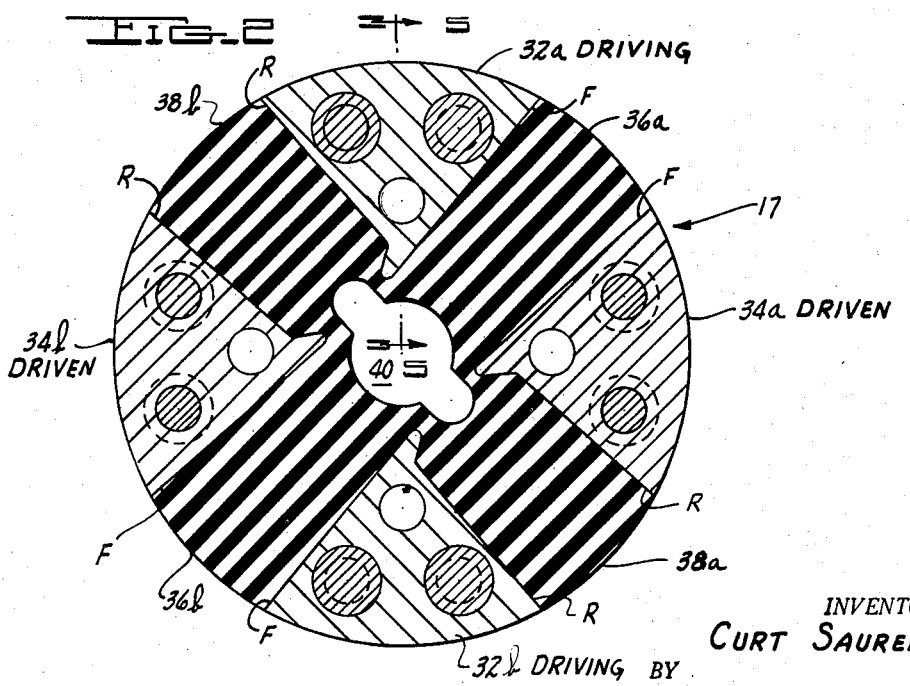
INVENTOR.
CURT SAURER
BY
SMITH, OLSEN, LEWIS & McRAE
ATTORNEYS March 10, 1959   C. SAURER   2,876,635
UNIVERSAL COUPLING
Filed March 5, 1956   2 Sheets-Sheet 2
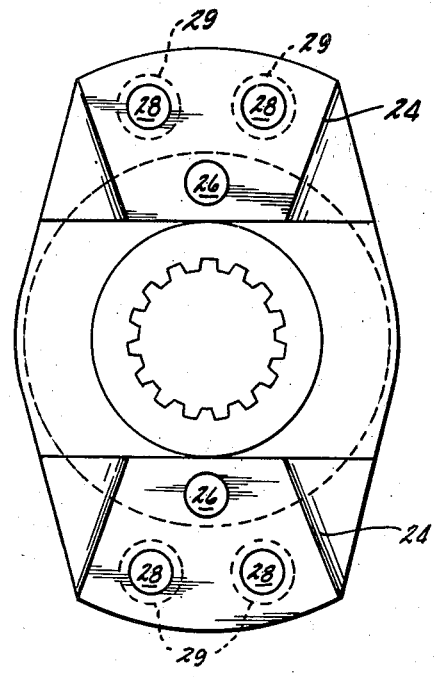
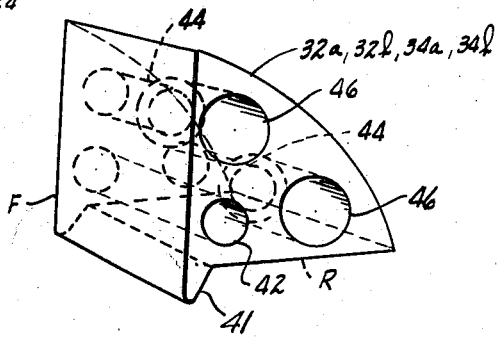
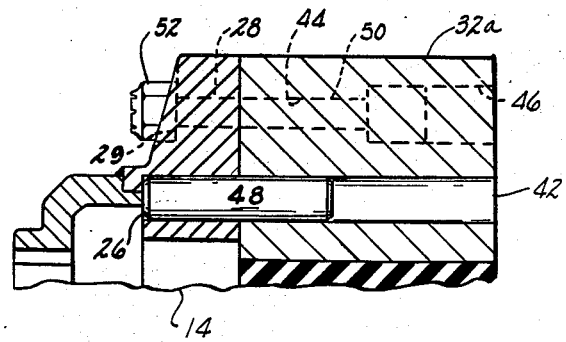
INVENTOR.
CURT SAURER
BY
SMITH, OLSEN, LEWIS & McRAE
ATTORNEYS United States Patent Office 2,876,635
Patented Mar. 10, 1959

2,876,635
UNIVERSAL COUPLING

Curt Saurer, Oak Park, Mich., assignor to U. S. Universal Joints Company, Detroit, Mich., a corporation of Michigan Application March 5, 1956, Serial No. 569,325

9 Claims. (Cl. 64—14)

The present invention relates to a universal coupling adapted for connecting a driving and a driven shaft and more particularly, a coupling having greater resilient capacity in one direction of rotation than in the other so that a coupling of any given size will have a greater capacity for certain specific application. The present invention is an improvement on the coupling disclosed in Patent No. 2,629,991 issued to Frederick M. Guy on March 3, 1953.

It is desirable to make universal couplings compact, light, and of small diameter so that they may be adapted for a wide variety of uses. In order to do this, it has been found advantageous to provide a coupling including a plurality of cylinder segments separated by a resilient body as set forth in the prior patent referred to above.

Such prior couplings have found application in the automotive field where they are used on each end of the drive shaft of an auto vehicle. Auto vehicles are propelled in a forward direction an overwhelmingly greater proportion of the time. It has been found that in ordinary use a vehicle is driven in a forward direction almost 1,000 times more than it is driven in a reverse direction. Consequently, the drive shaft turns most of the time in one direction. Also, it is during forward propulsion that the couplings on the drive shaft are subjected to greater strain such as in quick starting with a full load. Furthermore, much higher speeds are obtained in a forward direction than in a reverse direction. Therefore, if the universal couplings utilized on the drive shaft are designed for greatest capacity in one direction of rotation then the capacity of the coupling for applications where rotation and load in one direction predominates has been increased without increasing the over-all size of the coupling. This is of particular importance in auto vehicles because size is a limiting factor in the design of a universal coupling for such application.

It has been found that the load carrying capacity in compression of a rubber block such as is used in universal couplings of the present invention increases by the formula $I = N^2 - N$; in which $I =$ the increase in load carrying capacity, and $N =$ the number of square inches of the load carrying faces of the block. Universal couplings of the present invention take advantage of this formula and also of the fact that rotation of the couplings in a reverse direction will be at much slower speeds by providing a resilient member of smaller cross sections to transmit torque in a reverse direction in which instance the resilient element can safely be placed under higher stress and other resilient elements to transmit torque in a forward direction which are of larger cross section and which will not be as highly stressed under load without increasing the over-all diameter of the coupling.

Accordingly, it is a primary object of the present invention to provide a universal coupling having greater capacity in one direction of rotation than in the other.

Another object of the present invention is to provide a universal coupling having greater capacity in one direction of rotation thereby providing a coupling of greater capacity for certain applications without increasing the over-all size of the coupling.

Still another object of the present invention is to provide a universal coupling including driving and driven elements provided with greater opposed torque transmitting faces for transmitting torque in one direction and larger masses of resilient material between such greater opposed torque transmitting faces without increasing the over-all size of the coupling while still leaving adequate opposed torque transmitting faces on said driving and driven elements and associated masses of resilient material to be utilized to transmit sufficient torque in the opposite direction.

A further object of the present invention is to provide such a resilient coupling which is simple in construction and which is readily adapted to mass production methods of economical manufacture, the construction utilizing a relatively small number of parts.

Other objects of this invention will appear in the following description and appended claims, reference being had to the accompanying drawings forming a part of this specification wherein like reference characters designate corresponding parts in the several views.

In the drawings:

Figure 1 is a side view of a universal coupling embodying the present invention.

Figure 2 is a sectional elevation taken along the line 2—2 in the direction of the arrows, Figure 1.

Figure 3 is an end elevation of one of the flanges of the coupling of Figure 1 taken along the line 3—3 in the direction of the arrows Figure 1.

Figure 4 is a perspective view of one of the cylinder segments utilized in the universal couplings of Figures 1, 2 and 3.

Figure 5 is a partial sectional elevation taken on the line 5—5 in the direction of the arrows Figure 2, to show means of fastening the cylinder segments to the flanges.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The drawings disclose a particular embodiment of the present invention wherein a driving shaft is indicated by the number 10 and a driven shaft is indicated by the number 12. For purposes of description, the coupling and associated shafts illustrated in the drawings will be described as applied to the drive shaft of an automobile. Accordingly, when the assembly turns in a clockwise direction as viewed from the left end of Figure 1, the automobile will be driven in a forward direction. When the assembly rotates in a counterclockwise direction as viewed from the left of Figure 1, the automobile will be driven in a reverse direction.

Flanges 14 and 16 are provided on the shafts 10 and 12 respectively and are connected to the opposite faces of a central cylindrical member 17. The flanges 14 and 16 are essentially identical except that a cylindrical boss 18 on flange 14 is provided with a splined axial bore adapted to receive the splined end of shaft 10 and a corresponding cylindrical boss 20 on flange 16 is provided with an extending portion 22 which is a press fit within tubular shaft 12 and is welded as at 21 or otherwise suitably fastened to the shaft 12. The flanges 14 and 16 are each provided with extending foot portions 24 to engage the central cylindrical member 17. Figure 1 therefore illustrates two views of the identical flanges 14 and 16, flange 16 being rotated 90° in relation to flange 14.

Figure 3 is an end view of the flange 14 taken in the direction of the arrows 3—3 of Fig. 1 and shows in detail the inner face of flange 14. This inner face is identical with the inner face of flange 16. As can be seen in Fig. 3, the faces of the foot portions 24 have the general shape of a truncated disk segment. Each flange is provided with two bores 26 through the foot portions 24 and extending parallel to the axis of the flange and four bores 28 spaced radially from the bores 26 and circumferentially from each other. The bores 28 are countersunk slightly on the outer face of the flanges as at 29 to provide a flat seat in the sloping face of the flange. The purpose of the bores 26 and 28 will be described hereinafter.

Referring to Figure 2 of the drawings, the central cylindrical member 17 is composed of four cylinder segments 32a, 32b, 34a and 34b. These segments are identical in configuration except that the pair 32a, 32b is assembled in the coupling in the reverse of the position of pair 34a, 34b. The segments 32a, 32b are affixed to the flange 14 and are therefore the driving segments while segments 34a, and 34b are attached to flange 16 and are therefore the driven segments. Between the opposing faces of the segments there is disposed a resilient material such as rubber or the like. I have found it convenient to mold the entire body of resilient material in the form of a modified maltese cross with the cross bars thereof extending into the spaces between the cylinder segments. For purposes of illustration, in Figure 2 the arms forming one cross bar are indicated as 36a and 36b and the arms forming the other cross bar are indicated as 38a and 38b. A central hole 40 is provided in the body of the resilient material to provide relief space for flow of the resilient material under pressure. The mass of the resilient material is slightly greater than the spaces between the cylinder segments. Thus, when the central member 17 is assembled as shown in Figs. 1 and 2 the resilient material is pre-stressed. This pre-stress relieves tension strains on the arms not under compression when the coupling is transmitting torque. The material is bonded to the faces of the cylinder segments by any of a number of techniques well known in the art.

Referring now to Fig. 4 of the drawings, one of the cylindrical segments 32a, 32b, 34a, and 34b is illustrated in perspective view.

Each cylinder segment has two side faces (front and back as viewed in Fig. 4), two diverging faces (left side and bottom as viewed in Fig. 4) and a convex face extending between the outer edges of the diverging faces (top and extending down right side as viewed in Fig. 4). For the purpose of explanation, the diverging face at the left side in Fig. 4 is identified as face "F" and the diverging face at the bottom in Fig. 4 is identified as face "R." A ridge 41 is provided on face "R" adjacent the junction faces "F" and "R." The cross-sectional configuration of the ridge 41 is generally that of a right angle triangle having one long leg and one short leg with the short leg thereof disposed on face "R" and the long leg thereof contiguous with face "F." Thus, by the provision of the ridge 41, the area of face "F" is increased by the height of the ridge while the area of face "R" is decreased only by the width of the base of the ridge which is less than the height of the ridge. This seemingly small increase is extremely effective in accordance with the formula $I=N^2-N$ as discussed hereinbefore.

The cylinder segments are assembled into the central cylindrical member 17 as shown in Fig. 2, with the face "F" of each segment opposing face "F" of the next adjacent segment and the faces "R" similarly opposed for a purpose which will become apparent hereinafter. Each cylinder segment is provided with a bore 42 adjacent the apex of the segment and extening parallel to the diverging faces of the segment. Two bores 44 are also provided through each segment parallel to the bore 42 and spaced radially therefrom and circumferentially from each other to match the spacing of the bores 26 and 28 in the flanges 14 and 16 (Fig. 3). The bores 44 are countersunk as at 46 to receive therein the head of a bolt.

Referring now to Fig. 5 of the drawings the method of attaching the segments 32a, 32b, 34a and 34b to the flanges 14 and 16 can be described by pointing out the details of one such attachment. In the particular view shown in Fig. 5 a portion of the flange 14 is shown and the associated segment 32a of the pair 32a, 32b. A pin 48 is disposed with one end thereof a press fit in bore 26 of flange 14 and the other end thereof extending to be received in bore 42 of segment 32a. The pin 48 thus serves to readily locate the segment on the flange. A pair of bolts 50 one only of which is shown in Fig. 5 is utilized to affix the segment 32a to flange 14. The bolts 50 extend through bores 44 of segment 32a with the heads thereof disposed in the countersunk portions 46. The ends of the bolts extend through bore 28 in flange 14 and are threaded to receive the nuts 52. The need for the countersunk portions 29 previously described is now apparent as they provide a flat seat for the nuts 52. It is believed apparent that any other suitable fastening means could be utilized to affix the segments to the flanges. The foot portion 24 of the flange 14 is hereinbefore described is shaped to conform with the face of the segment 32a which it engages so as not to chafe the outer face of the resilient material.

Referring now to Fig. 2 of the drawings, the novel features providing for greater torque capacity of the universal coupling in one direction of rotation can be explained in detail. As indicated in Fig. 2, the driving segments and the driven segments are arranged alternately. Assuming rotation of the coupling clockwise as viewed in Fig. 2, torque is transmitted from face "F" of cylinder segment 32a through the portion 36a of the resilient material to face "F" of cylinder segment 34a and torque is also transmitted from face "F" of cylinder segment 32b through the portion 36b of the resilient material to face "F" of cylinder segment 34b. This is the direction of rotation which will drive the auto vehicle in a forward direction. Consequently, it is desirable that these portions 36a, 36b of the resilient material be of greater mass than portions 38a and 38b since portions 38a and 38b are the portions which will be utilized to transmit torque when the coupling revolves in a counterclockwise direction to drive the vehicle in reverse. I have found that providing the ridges 41 on the cylindrical segments and assembling the segments in the central portion 30 in the position shown in Fig. 2 provides a greater area of contact between the driving segments and the driven segments during clockwise drive than during counterclockwise drive.

Thus, it can be seen, I have provided to transmit torque in one direction, greater opposed torque transmitting faces between the driving and driven segments and larger masses of resilient material between such larger torque transmitting faces without increasing the over-all size of the coupling and still leaving adequate opposed faces and associated resilient material utilized to transmit torque in the opposite direction.

I have found that I can increase the capacity of a commercially acceptable coupling having a relatively small diameter to the point where it will transmit as much as 35% more torque in one direction with a decrease of only 17% in the torque transmitting capacity in the opposite direction without increasing the over-all size of the coupling.

Having thus described my invention, I claim:

1. A resilient coupling adapted to flexibly connect a driving shaft and a driven shaft and comprising flanges normally disposed in substantially parallel planes adapted for connection to adjacent shaft ends and having opposed alternating driving and driven members spaced from each other lying in a common plane, a resilient element having portions thereof disposed in the spaces between said driving and driven members and secured to said driving and driven members whereby relative movement of the driving and driven members and the connected shafts is accommodated by distortion of said resilient element, alternating spaces between said driving and driven members being of greater area than the remainder of said spaces to provide alternate portions of said resilient element greater in area than the remainder of said portions said alternate portions of said resilient element being utilized to transmit from driving members to driven members in one direction of rotation of said driving shaft and the said remaining portions of said resilient element being utilized to transmit torque during rotation of said driving shaft in the opposite direction.

2. In a resilient coupling, the combination of driving and driven members adapted to be connected to a driving and a driven shaft respectively and comprising metallic cylinder segments lying in a common plane and spaced from each other and a body of resilient material having portions thereon disposed in said spaces between said cylinder segments and affixed to said spaced cylinder segments, alternate spaces between said cylinder segments being of greater area than the remainder of said spaces to provide alternate portions of said resilient material greater in size than the remainder of said portions of said resilient material, said alternate portions of said resilient material being utilized to transmit torque during rotation of said driving shaft in one direction and the remainder of the portions of said resilient material being utilized to transmit torque during rotation of said driving shaft in the opposite direction.

3. A resilient coupling adapted to flexibly connect a driving shaft and a driven shaft and comprising a pair of flanges normally disposed in substantially parallel planes, the first of said flanges being adapted for connection to said driving shaft and the second of said flanges being adapted for connection to said driven shaft; a plurality of driving cylinder segments affixed to said first flange; a plurality of similar driven cylinder segments affixed to said second flange and resilient elements interposed between said driving and driven segments and affixed thereto; one face of each of said driving segments and the directly opposed face of each of said driven segments being of greater area than other opposing faces of said driving and driven segments the first mentioned of said faces being utilized to transmit torque during rotation of said driving shaft in one direction and the second mentioned of said faces being utilized to transmit torque during rotation of said driving shaft in the opposite direction.

4. A resilient coupling for connecting a driving shaft and an abutting driven shaft and comprising a plurality of driving cylinder segments spaced about said driving shaft and connected to the end thereof each of said cylinder segments having two diverging faces and being disposed with the line of intersection of said diverging faces extending parallel to the normal axis of said driving shaft with the faces diverging outwardly; a plurality of similar driven cylinder segments connected to the end of said driven shaft and similarly disposed in relation to said driven shaft and arranged in alternating relation to the said driving cylinder segments, one diverging face of each of said driving segments and the directly opposed diverging face of each of said driven segments being of greater area than the other diverging face of each of said driving and driven segments, said greater diverging faces being utilized to transmit torque during rotation of said driving shaft in one direction and the others of said diverging faces being utilized to transmit torque during rotation of said driving shaft in the opposite direction; and a resilient element interposed between said driving and driven segments and bonded thereto whereby a resilient driving connection is provided between said shafts.

5. A resilient coupling adapted to flexibly connect a driving shaft and a driven shaft and comprising a pair of flanges normally disposed in substantially parallel planes, the first of said flanges being adapted for connection to said driving shaft and the second of said flanges being adapted for connection to said driven shaft; a plurality of driving cylinder segments affixed to said first flange each of said cylinder segments having two diverging faces and being disposed with the line of intersection of said diverging faces extending parallel to the normal axis of said driving shaft with the faces diverging outwardly; a plurality of similar driven cylinder segments affixed to the said second flange and similarly disposed in relation to said driven shaft and arranged in alternating relation to the said driving cylinder segments affixed to said first flange, one diverging face of each of said driving segments and the directly opposed diverging face of each of said driven segments being of greater area than the other diverging face of each of said driving and driven segments said greater diverging faces being utilized to transmit torque during rotation of said driving shaft in one direction and the others of said diverging faces being utilized to transmit torque during rotation of said driving shaft in the opposite direction; and a resilient element having portions thereon interposed between said driving and driven segments and bonded thereto whereby a resilient driving connection is provided between said shafts.

6. A resilient coupling for connecting a driving shaft and an abutting driven shaft and comprising a plurality of driving cylinder segments spaced about said driving shaft and connected to the end thereof each of said cylinder segments having two diverging faces and being disposed with the line of intersection of said diverging faces extending parallel to the normal axis of said driving shaft with the faces diverging outwardly; a plurality of similar driven cylinder segments connected to the end of said driven shaft and similarly disposed in relation to said driven shaft and arranged in alternating relation to the said driving cylinder segments, one diverging face of each of said driving segments and the directly opposed diverging face of each of said driven segments having a ridge formed thereon adjacent the intersection of the diverging faces and extending therealong the cross-sectional configuration of said ridge being generally that of a right angle triangle having one leg thereof forming the base of said ridge and the other leg thereof extending contiguous with the other of said diverging faces to increase the area thereof, said greater diverging faces being utilized to transmit torque during rotation of said driving shaft in one direction and the others of said diverging faces being utilized to transmit torque during rotation of said driving shaft in the opposite direction; and a resilient element interposed between said driving and driven segments and bonded thereto whereby a resilient driving connection is provided between said shafts.

7. A resilient coupling as claimed in claim 6 and further characterized in that the width of said ridge formed on each of said cylinder segments is less than the height of said ridge so that the ridge decreases the area of the diverging face on which it is formed a lesser amount than the area of the other diverging face is increased.

8. A resilient coupling adapted to flexibly connect a driving shaft and a driven shaft and comprising a pair of flanges normally disposed in substantially parallel planes, the first of said flanges being adapted for connection to said driving shaft and the second of said flanges being adapted for connection to said driven shaft; a plurality of driving cylinder segments affixed to said first flange each of said cylinder segments having two diverging faces and being disposed with the line of intersection of said diverging faces extending parallel to the normal axis of said driving shaft with the faces diverging outwardly; a plurality of similar driven cylinder segments affixed to the said second flange and similarly disposed in relation to said driven shaft and arranged in alternating relation to the said driving cylinder segments affixed to said first flange, one diverging face of each of said driving segments and the directly opposed diverging face of each of said driven segments having a ridge formed thereon adjacent the intersection of the diverging faces and extending therealong the cross-sectional configuration of said ridge being generally that of a right angle triangle having one leg thereof forming the base of said ridge and the other leg thereof extending contiguous with the other of said diverging faces to increase the area thereof, said greater diverging faces being utilized to transmit torque during rotation of said driving shaft in one direction and the others of said diverging faces being utilized to transmit torque during rotation of said driving shaft in the opposite direction; and a resilient element having portions thereon interposed between said driving and driven segments and bonded thereto whereby a resilient driving connection is provided between said shafts.

9. A resilient coupling as claimed in claim 8 and further characterized in that the width of said ridge formed on each of said cylinder segments is less than the height of said ridge so that the ridge decreases the areas of the diverging face on which it is formed a lesser amount than the area of the other diverging face is increased.

References Cited in the file of this patent
UNITED STATES PATENTS

| | | |
|---|---|---|
| 2,121,066 | Anderson et al. | June 21, 1938 |
| 2,629,991 | Guy | Mar. 3, 1953 |
| 2,659,219 | Mosso et al. | Nov. 17, 1953 |